June 14, 1949.
H. T. JENSEN
2,473,147
SLIP RING STRUCTURE
Filed Jan. 15, 1946
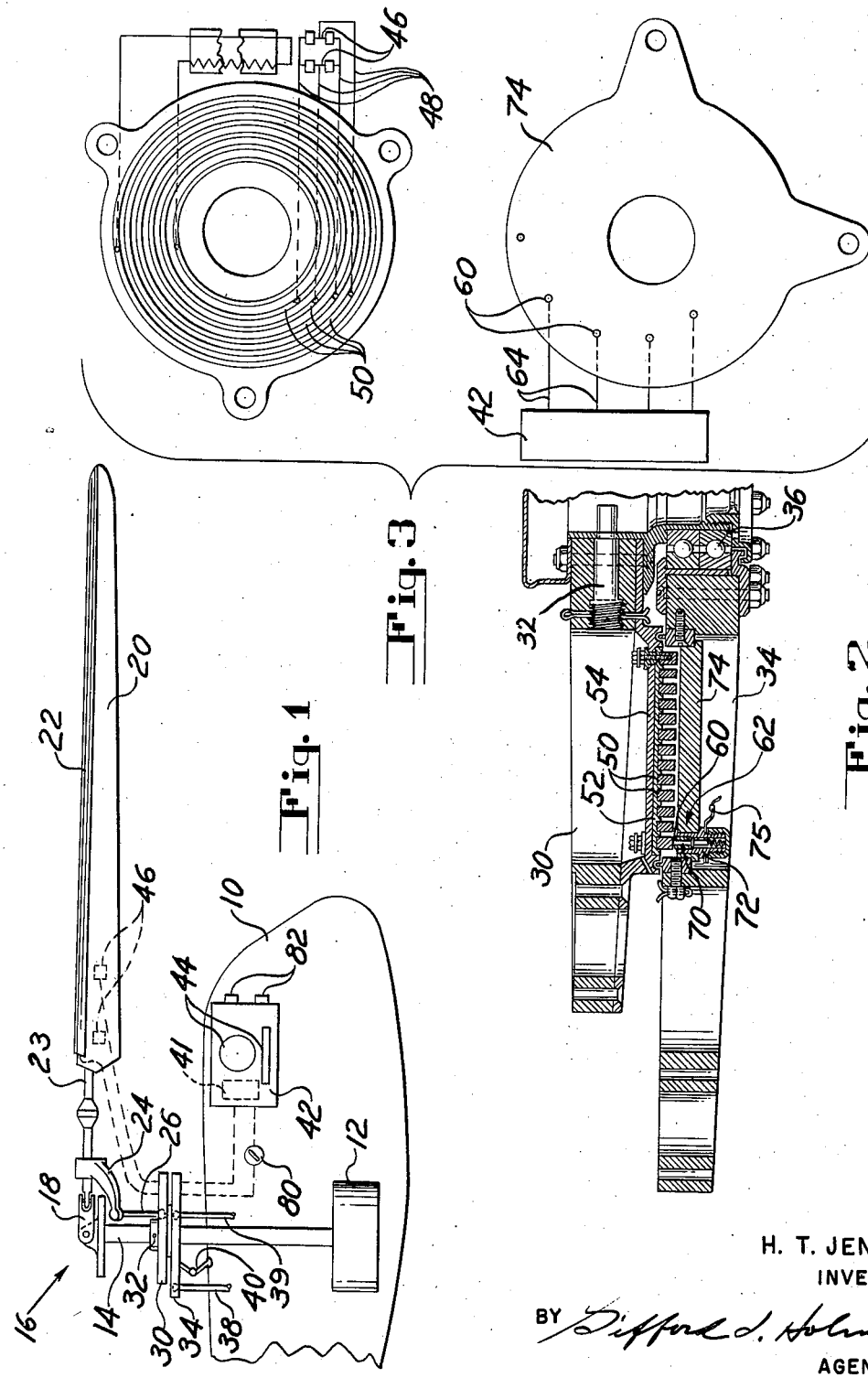
H. T. JENSEN
INVENTOR
BY Clifford J. Holmes
AGENT Patented June 14, 1949

2,473,147

UNITED STATES PATENT OFFICE 2,473,147

SLIP-RING STRUCTURE

Harry T. Jensen, Milford, Conn., assignor to United Aircraft Corporation, East Hartford, Conn., a corporation of Delaware Application January 15, 1946, Serial No. 641,396

7 Claims. (Cl. 244—134)

This invention relates generally to indicating and recording means for rotor blades of helicopters and to means for transferring electric power to a rotor blade through the tiltable rotating parts of the helicopter rotor to supply users thereof in the rotating parts and to translate signals pertaining to functions of the rotor blades and associated parts.

In the construction of helicopters and other rotary wing craft, certain information regarding the operation of a blade during high speed flight and when hovering in substantially still air has been very difficult to obtain. With stationary test stands for rotors and for rotor blades, the operation of the blades and the parts associated therewith close to the ground necessarily reflects the effect of the ground upon the rotor blades. Such ground effects are caused by directing air against a surface which deflects it and so reflects back incidental vibrations imparted to the air at the speed of sound and also builds up back pressure to create errors in the readings obtained from equipment providing stationary tests adjacent the ground.

For the above reason, an improved means including tiltable means for effecting conditions approximating flight conditions are provided in this invention for improving readings in stationary test stands. This mechanism is also readily adaptable and useable in flight to test blade conditions such as stresses and flow characteristics of the supporting medium past different parts, or any conditions conducive to electrical instrumentation, which instruments will produce a signal in proportion to the function. The means is also useable, and as an added feature, affords connection with the rotor blade of an electrical type de-icing means which has hitherto not been useable in rotor blades because the energy could not be readily translated from a source of electrical power to the rotor blade.

Accordingly, it is an object of this invention to provide electrical conducting means in combination with the tiltable control means of a helicopter in a manner to maintain the weight within practical limits without diminishing the strength of any vital parts associated therewith.

Another object lies in the use of a device such as set forth in the preceding object interposed between a source of electrical power and an electrical heater upon a rotor blade for preventing the formation of ice thereon.

A further object lies in the use of a device as set forth in the first preceding object with means for measuring strain of the rotor blade and indicating and recording information of the strain of a blade during operating thereof.

Other objects and advantages of this invention reside in the combination of parts including the details of construction which permit of building a translating device in a tiltable portion of the control mechanism for a rotor head without preventing any normal action of the blade and without interfering in any way with the normal control of the helicopter, and will be either obvious or pointed out in the following specification and claims interpreted in view of the accompanying drawing in which:

Fig. 1 is a diagrammatic view of only the forward portion of a helicopter with a rotor drive shaft, rotor blade, and the operating mechanism of this invention associated therewith;

Fig. 2 is a detail partial sectional view of the tiltable mechanism including the present invention and, Fig. 3 is a diagrammatic exploded view of the upper and lower mating portions of the tiltable mechanism shown connected with the source of power and indicating mechanism.

In Fig. 1, a helicopter 10 is provided with an engine 12 for turning a drive shaft 14. The shaft 14 is equipped with a rotor head 16 which mounts a flapping hinge 18 carrying a blade 20 upon a spar 23. The blade 20 is provided in its leading edge with a heating strip 22 which may be of the type comprising a rubber body with resistant metal filler for conducting electrical power and transferring it into heat to prevent icing of the blade. The strip 22 is shown as mounted only on the leading edge of the blade, but it is to be understood that other parts of the blade can be similarly covered. It is also to be understood that other resistance type heaters than the rubber fabric type can be used without departing from the spirit of this invention, and the specific type of heater does not form a part of this invention.

The rotor blade 20 can be feathered by rocking the spar 23 which is provided with a control horn 24 connected to a push-pull rod 26. A tiltable plate 30 is mounted by a universal joint 32 upon the drive shaft 14. As best shown in Fig. 2, a stationary plate 34 is mounted upon a bearing 36 upon the plate 30. The plate 34 is tiltable by rods 38 and 39, and also may be moved up and down by simultaneously moving the rods in such direction to change the pitch of the blade, or blades. As the rods 38 and 39 are moved with respect to each other, the plate 34 will be tilted to tilt the plate 30 about the universal 32. The plate 34 is maintained non-rotatable with respect to the body 10 of the fuselage by a scissors arrangement 40 that is pivoted at two points for up and down rocking of the tilt plate 34 and has a universal joint in its upper end connecting it to the plate 34 to permit of the tilting of the plate in other senses. For further details of construction of such a scissors and of control means operable in accordance with this invention, reference may be had to the application of Ralph Paul Alex and Michel D. Buivid, U. S. appl. Ser. No. 599,920, filed June 16, 1945.

The tilt plates 30 and 34 are adapted to transfer electrical power from a source of power 41 that may be enclosed in a casing 42, which casing may also carry indicators 44 or recorders or the like for indicating functions to be measured. Strain gauges 46 are shown adjacent the root of the rotor blade 20 and are connected by wires 48 to rings 50 (Fig. 3) mounted upon insulating material 52 (Fig. 2) upon a web 54 of the upper plate 30. Signals generated in the strain gauges 46, which may contain a resistance responsive to stretching to indicate strain of the part to which it is attached, will pass through the wires 48 to the rings 50 and through contacts 60, only one of which is shown in detail at 62 in Fig. 2. The current passes from the contacts 60 through wires 64 (Fig. 3) to the indicator 44 within the casing 42.

Each of the contactors 62 comprises the contact 60 carried upon a conducting rod 70 in a conducting sleeve 72 which is secured into an insulating web 74 in the lower plate 34. A conductor tab 75 is connected with the wire 64, which is flexible. Enough contacts are disposed around the plate 74 to accommodate the transfer of electrical power through each of the rings 50 separately from each of the others. Inasmuch as the member 34 is held stationary with the fuselage 10, the wires 64 may pass directly from the tabs 75 to the indicating mechanism 44 or to the source of power 41 within the housing 42, as required.

For operation of the heater to prevent the formation of ice upon the blade 20, a switch 80 is provided in the cockpit of the helicopter and may be turned on during icing ambient conditions to supply power to the heater 22. Switches 82 may be operated to obtain readings or indications of the functions of the different parts of the rotor mechanism and of the rotor blade as indicated from a pickoff element, such as the strain gauge 46, or other device for generating signals indicative of a function to be measured.

While I have shown one form of my invention including means associated with a tiltable power translating mechanism for a heater and for a strain gauge, it will be understood that a large number of rings 50 can be provided to obtain simultaneously several different types of information or information from a large number of stations in a rotor blade, for example. Hence, although I have shown only a few conductor rings 50, for purposes of clarity in Fig. 2, it will be understood that a much larger number can be provided.

For the above reasons, I wish not to be limited in my invention only to the specific structure shown but by reasonable modifications thereof as interpreted in view of the following claims.

I claim:

1. The combination with a helicopter having a rotor blade turned by a drive shaft, of control means for changing the pitch of said blade including two parts, one part being universally mounted upon and rotatable with said shaft, and the other part being mounted upon the one part but not rotatable therewith, and means for sensing and translating a function of said blade comprising, electrical condition responsive means associated with said blade, an insulating plate having a plurality of annular grooves connected with said one part, a first translator comprising rings in said grooves connected to said condition responsive means and rotatable with said one part, non-rotating contacts forming a second translator connected with said other part and in slidable electrical contact with said first translator, and means for transposing signals created by the condition.

2. The combination with a helicopter having a rotor blade turned by a drive shaft, of control means for changing the pitch of said blade including two parts, one part being universally mounted upon and rotatable with said shaft and the other part being mounted upon the one part but not rotatable therewith, and means for sensing and translating a function of said blade comprising, electrical condition responsive means associated with said blade, a first movable translator connected with said one part and to said condition responsive means and rotatable with said one part, a second translator connected with said other part and in slideable electrical contact with said movable translator, and means for transposing signals created by the condition.

3. The combination in a helicopter having a body and a rotor blade turned by a shaft, of an electrical heater mounted upon said blade for preventing formation of ice, tiltable means for controlling the pitch of the blade and including relatively rotatable parts, one part being universally mounted upon and rotatable with said shaft, and the other part being mounted upon said one part but held against rotation therewith, a source of electrical power, and conductor means from said source to said heater including pairs of means, each pair being fixed with respect to said parts and in slideable engagement with each other for conducting power through said tiltable means to said heater.

4. The combination in a helicopter having a rotor blade turned by a shaft, of an electrical heater mounted upon said blade for preventing formation of ice, tiltable means for controlling the pitch of the blade and including relatively rotatable parts, one part being universally mounted upon and rotatable with said shaft, and the other part being mounted on said one part but not rotatable therewith, a source of electrical power, and conductor means from said source to said heater including means comprising relatively movable contacts carried by said parts in slideable engagement therebetween for conducting power through said tiltable means to said heater.

5. The combination in a helicopter having a rotor blade turned by a shaft, of an electrical heater mounted upon said blade for preventing formation of ice, tiltable means for controlling the pitch of the blade and including relatively rotatable parts having one part universally mounted and rotatable with said shaft, a source of electrical power, and conductor means from said source to said heater including contacts fixed with respect to said parts and in slideable engagement with each other for conducting power through said tiltable means to said heater.

6. The combination in a helicopter having a rotor blade turned by a drive shaft, of control means for changing the pitch of said blade including two parts, one part being universally mounted upon and rotatable with said shaft, and the other part being mounted upon said one part but not rotatable therewith, a source of electric power, electro-responsive means associated with said blade, and means connecting said source and said electro-responsive means comprising, an insulating plate connected with said one part having a plurality of annular grooves, conductor rings in said grooves connected to said electro-responsive means and rotatable with said one part, and non-rotating contacts associated with said other part in slideable electrical contact with said rings and connected to said source.

7. The combination in a helicopter having a body and a rotor blade turned by a drive shaft, of control means for changing the pitch of said blade totally and cyclically and including two parts, one part being universally mounted upon and rotatable with said shaft, the other part being mounted upon said one part but restrained from rotational movement therewith by a connection to said body, both of said parts being adapted for axial movement by said control means for changing the total pitch of said blade and for tilting movement with respect to said shaft for varying the pitch of said blade cyclically, a source of electric power in said body, electro-responsive means associated with said blade, and means connecting said source and said electro-responsive means comprising, an insulating plate connected with said one part having a plurality of annular grooves, conductor rings in said grooves connected to said electro-responsive means and rotatable with said one part, and non-rotating contacts associated with said other part in slideable electrical contact with said rings and connected to said source.

HARRY T. JENSEN.

REFERENCES CITED

The following references are of record in the file of this patent:

UNITED STATES PATENTS

| Number | Name | Date |
|---|---|---|
| 2,252,464 | Kearns et al. | Aug. 12, 1941 |
| 2,350,072 | Simmons | May 30, 1944 |
| 2,402,770 | Poekel | June 25, 1946 |
| 2,416,276 | Ruge | Feb. 18, 1947 |